United States Patent [19]

Illy et al.

[11] Patent Number: 4,792,119
[45] Date of Patent: Dec. 20, 1988

[54] VALVE

[75] Inventors: Alois Illy, Limburgerhof; Günter Alberti, Frankenthal; Karlheimz Feierlein, Abenberg, all of Fed. Rep. of Germany

[73] Assignee: Klein, Schanzlin & Becker Aktiengesellschaft, Frankenthal, Fed. Rep. of Germany

[21] Appl. No.: 27,614

[22] Filed: Mar. 18, 1987

[30] Foreign Application Priority Data

Mar. 22, 1986 [DE] Fed. Rep. of Germany ....... 3609772

[51] Int. Cl.$^4$ ............................................. F16K 1/36
[52] U.S. Cl. ..................... 251/333; 251/86; 251/88
[58] Field of Search ................. 251/333, 86, 88

[56] References Cited

U.S. PATENT DOCUMENTS 2,685,426  8/1954  MacGregor .................. 251/333 X
3,979,105  9/1976  Pool et al. ...................... 251/333 X

FOREIGN PATENT DOCUMENTS 0109626  5/1984  European Pat. Off. .
546464  3/1932  Fed. Rep. of Germany ...... 251/333
1053263  3/1959  Fed. Rep. of Germany ...... 251/333

Primary Examiner—Arnold Rosenthal
Attorney, Agent, or Firm—Peter K. Kontler

[57] ABSTRACT

A valve wherein the housing has an internal seat having a sealing face which surrounds a seat area that is inclined with reference to the axis of a stem for the valving element. The sealing face is tapered and forms part of a conical surface. In order to ensure that the valving element is pressed against the sealing face, the line of action of the force which is applied by the stem is eccentric to the axis of the conical surface.

15 Claims, 8 Drawing Sheets

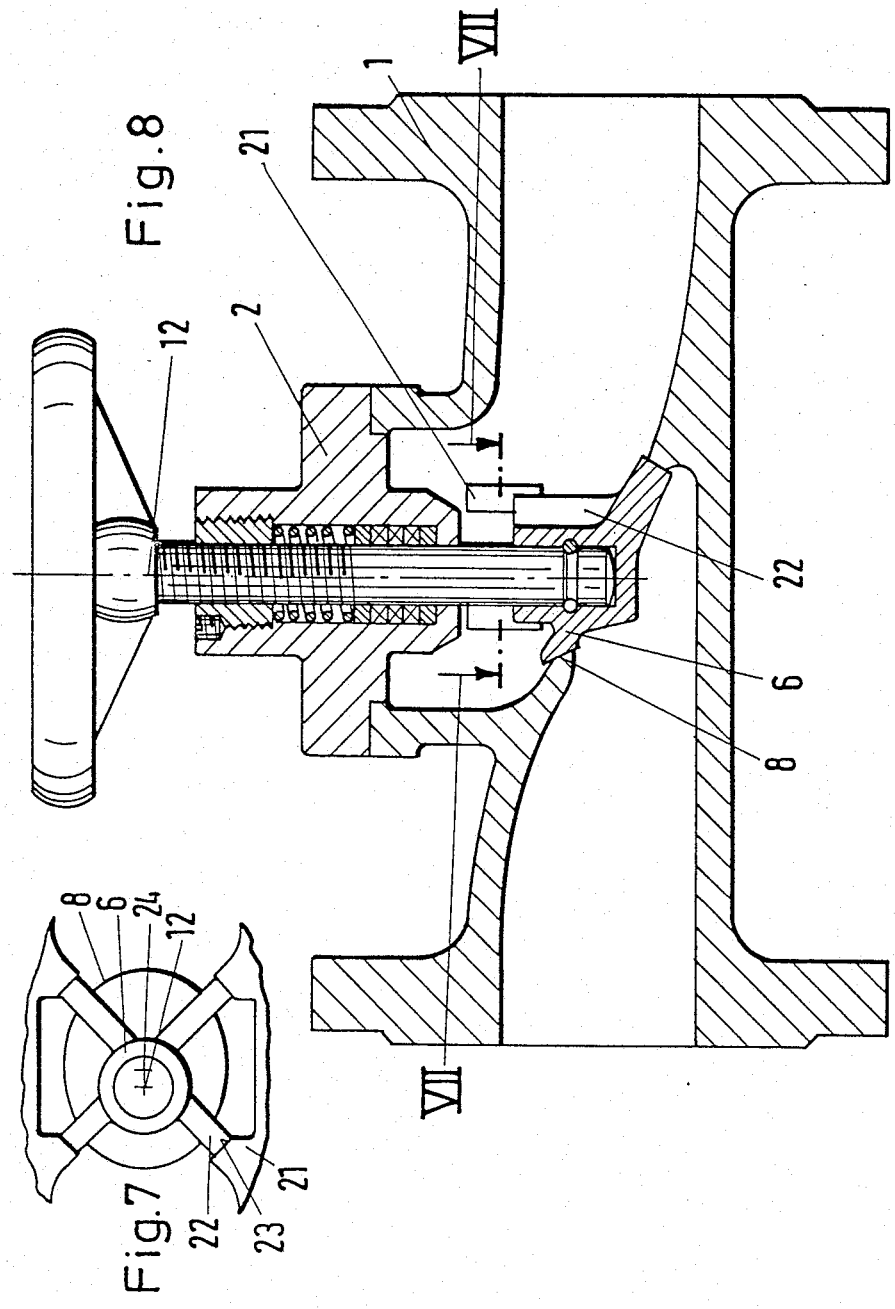

VALVE

BACKGROUND OF THE INVENTION

The invention relates to valves in general, and more particularly to improvements in valves of the type wherein a valving element is mounted on and is movable by a reciprocable stem toward and from a position of sealing engagement with a seat in the interior of a valve housing or body. Still more particularly, the invention relates to improvements in valves of the type wherein the seat in the interior of the housing has a seat area which is inclined with reference to the axis of the stem, and the sealing face which surrounds the seat area is tapered and forms part (particularly an oblique strip-shaped part) of a conical surface.

German Pat. No. 546,464 discloses a valve wherein the seat area makes an oblique angle with the axis of a pipe in which the valve seat is used. The seat area is an oblique section through a circular cone, and the valving element is a conical frustum which is coaxially secured to the stem and is provided with means for preventing it from rotating relative to the housing. The passage through the housing of the patented valve is designed with a view to offer a minimum of resistance to the flow of fluid. The sealing effect of the valving element is not entirely satisfactory, and this is believed to be attributable to oblique setting of the seat area as well as to insufficient surface pressure upon those parts of the sealing face which are located in the plane including the axis of the stem and the axis of the pipe.

European patent application No. 0 109 626 discloses a diaphragm valve wherein the diaphragm cooperates with a seat which is placed at an oblique angle to the axis of the pipe. The valving element is attached to and is held by the diaphragm in requisite position with reference to the seat in the housing of the valve. A stem in the upper part of the housing is arranged to act indirectly upon the valving element by way of force transmitting means. The valve of this patent application acts not unlike a butterfly valve in that the valving element bears upon that part of the sealing face which is nearest to the top portion of the housing and is pivoted by the stem about such part between an open and a closed or sealing position. Proper functioning of the valving element is ensured by the diaphragm to which the valving element is secured. The conical valving element is subjected to one-sided stresses in the region of the sealing face nearest to the apex of the conical surface of which the sealing face is a part. Such one-sided engagement leads to insufficient surface pressures upon the slightly stressed portion or portions of the sealing face and/or to excessive surface pressures upon the strongly stressed portion or portions of the sealing face. In either event, the sealing action is problematic and unreliable, even if the valve is designed to furnish a so-called soft sealing action.

OBJECTS AND SUMMARY OF THE INVENTION

An object of the invention is to provide a valve with a linearly movable valving element which exhibits a low resistance to the flow of conveyed fluid media and wherein the stem can apply a firm surface pressure upon all parts of the sealing face so that it is possible to achieve a reliable sealing action with a low leakage rate.

Another object of the invention is to provide a novel and improved seat and a novel and improved valving element for use in the above outlined valve.

A further object of the invention is to provide a novel design of the sealing face in the above outlined valve.

Still another object of the invention is to provide for a novel and improved distribution of stresses upon the abutting surfaces of the valving element and the seat in the sealing position of the valving element.

An additional object of the invention is to provide a valve wherein the movements of the valving element toward and/or away from the position of engagement with the seat are controlled in a novel and improved way.

The improved valve comprises a housing, a seat in the housing, a valving element in the housing, and moving means which is actuatable to move the valving element in the housing toward and away from engagement with the seat. The moving means includes a shank or stem having a first axis which is inclined with reference to the seat and the seat has a tapered sealing face which is engageable by the valving element and constitutes a portion of a conical surface surrounding a seat area. The conical surface has an apex and a second axis, and the stem is actuatable (e.g., by a knob) to exert upon the valving element a stem force having a line of action which intersects the seat area at a first location disposed at a first distance from the apex of the conical surface. The second axis (of the conical surface) intersects the seat area at a second location at a lesser second distance from the apex of the conical surface. Thus, there is an eccentricity between the line of action of the stem force and the axis of the conical surface. In conjunction with the feature that the seat is inclined with reference to the axis of the stem, this ensures the establishment of a stabilizing and centering action upon the valving element at the sealing face.

The second axis (of the conical surface) can be inclined with reference to the line of action of the stem force. The arrangement may be such that the line of action intersects the second axis at a location more distant from the apex than the second location.

The line of action of the stem force can be parallel to the second axis.

An end portion of the stem can be mounted in the valving element and the latter can include a portion (e.g., a rounded protuberance) which is eccentric with reference to the first axis and is contacted the stem at least while the stem transmits force to the valving element.

The arrangement may be such that a first portion of the sealing face is nearest to and a second portion of the sealing face is most distant from the apex of the conical surface. The first portion and the sealing face in the region of such portion make an angle of at least 90°, and an imaginary line which connects the two portions of the sealing face makes with the first portion an angle of less than 91°, i.e., not greater than 90°.

The valving element can be provided with a resilient seat-contacting portion and/or the housing can include a resilient portion (e.g., made of an elastomeric material) which defines the seat.

The valving element and the housing can comprise cooperating guide means (e.g., cooperating ribs, ribs and grooves or teeth and tooth spaces) for the valving element, and such guide means can extend in parallelism with the (first) axis of the stem.

Alternatively, the housing can contain guide means for imparting to the valving element a combined translatory and angular movement (e.g., a movement which is induced by the stem while a portion on its periphery advances along a helical path) in response to actuation of the moving means for the valving element. Such guide means can include a portion which is provided on the housing (e.g., on a detachable cover of the housing), a portion which is provided on the stem and/or a portion which is provided on the valving element.

The seat area can be substantially flat or it can exhibit a more or less pronounced curvature.

The novel features which are considered as characteristic of the invention are set forth in particular in the appended claims. The improved valve itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 7 is a fragmentary sectional view as seen in the direction of arrows from the line VII—VII in FIG. 8 and shows a detail in a seventh valve;

FIG. 8 is a longitudinal sectional view of the valve which includes the structure of FIG. 7 and wherein the valving element is held against stray movements relative to the housing;

DESCRIPTION OF THE PREFERRED EMBODIMENTS

Figure 1:
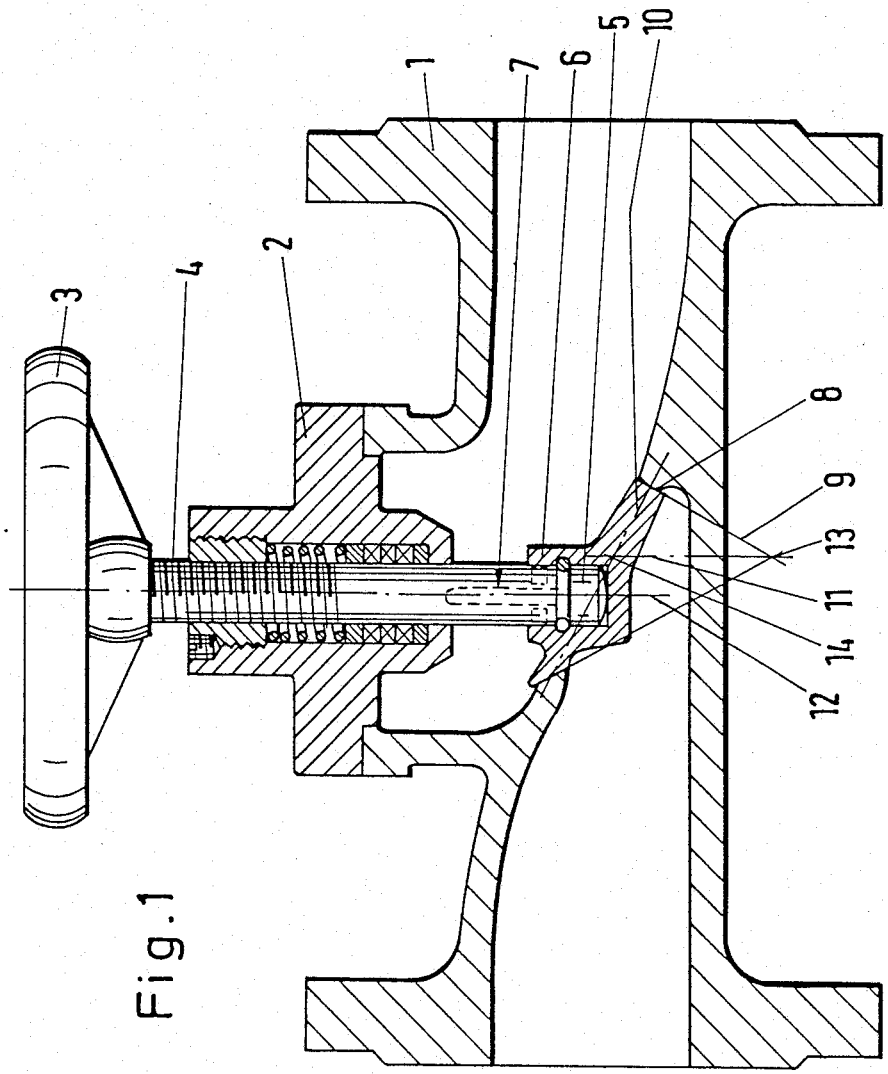
FIG. 1 is a longitudinal sectional view of a valve which embodies one form of the invention and wherein the axis of the stem, which carries the valving element, extends at right angles to the axis of the tubular housing, the valving element being shown in a position of sealing engagement with the seat.

FIG. 1 shows a valve wherein the stem or shank 4 for the valving element 6 extends at right angles to the axis of the housing or body 1. The housing 1 has a detachable cover 2 through which the stem 4 extends, and the outer end portion of the stem carries a hand wheel 3. The cover 2 contains a nut for the externally threaded portion of the shank 4 as well as a seal to prevent leakage of conveyed fluid medium along the periphery of the stem.

The valving element 6 is rotatably mounted on the inner end portion of the stem 4 and is held against rotation with the stem by suitable guide means 7 provided in the housing 1 and/or on the valving element to confine the latter to linear movements in the axial direction of the stem 4 when the latter is rotated by the hand wheel 3 in order to move the valving element toward or away from the sealing position of FIG. 1. The sealing face 8 of the seat in the housing 1 forms part of a conical surface 9 having an apex 13 and an axis 11. The seat area 10 which is surrounded by the sealing face 8 makes an oblique angle with the axis 12 of the stem 4. The valving element 6 engages the sealing face 8 when it assumes the sealing position of FIG. 1 to thereby prevent the flow of a fluid medium through the opening which is defined by the seat (i.e. through the seat area 10).

The sealing face 8 can be said to constitute a strip- or band-like part of the conical surface 9, and the axis 11 of this conical surface is parallel to the axis 12 of the stem 4, i.e., the axis 11 and the seat area 10 also make an oblique angle. The illustrated sealing face 8 can be replaced with another sealing face without departing from the spirit of the invention. For example, the seat can have a crowned sealing face; the conical surface is then generated by a tangent to the sealing face.

The line of action of the stem 4 coincides with the axis 12, and the distance of such line of action from the apex 13 of the conical surface 9 is greater than the distance from such apex to the point or location 14 where the axis 11 of the conical surface intersects the seat area 10.

The cover 2 comprises a portion which extends into the interior of the major part of the housing 1, and the axis of the cover coincides with the axis 12 of the stem 4. The inner end portion 5 of the stem 4 applies a force to that part of the valving element 6 which is more distant from the apex 13 than the point or location 14 of intersection of the axis 11 With the seat area 10.

The conical surface 9 can be a circular conical surface, an elliptical conical surface, a part circular and part elliptical conical surface or an elliptical conical surface which is cut circularly. Those portions of the valving element 6 which come into sealing contact with the sealing face 8 can be soft or hard, and the same holds true for those portions of the seat in the housing 1 which define the sealing face. Furthermore, it is possible to provide the housing 1 wit a flat, crowned or knife-edge type seat.

Due to eccentric application of the force in the seat area 10 within the confines of the sealing face 8, the line of action of the stem 4 is eccentric to the axis 11 of the conical surface 9. In conjunction with the obliquely running sealing face 8 of the seal in the housing 1, this ensures that the valving element 6 is subjected to a desirable stabilizing and centering action which guarantees the application of a satisfactory sealing pressure along the entire sealing face 8.

Figure 2:
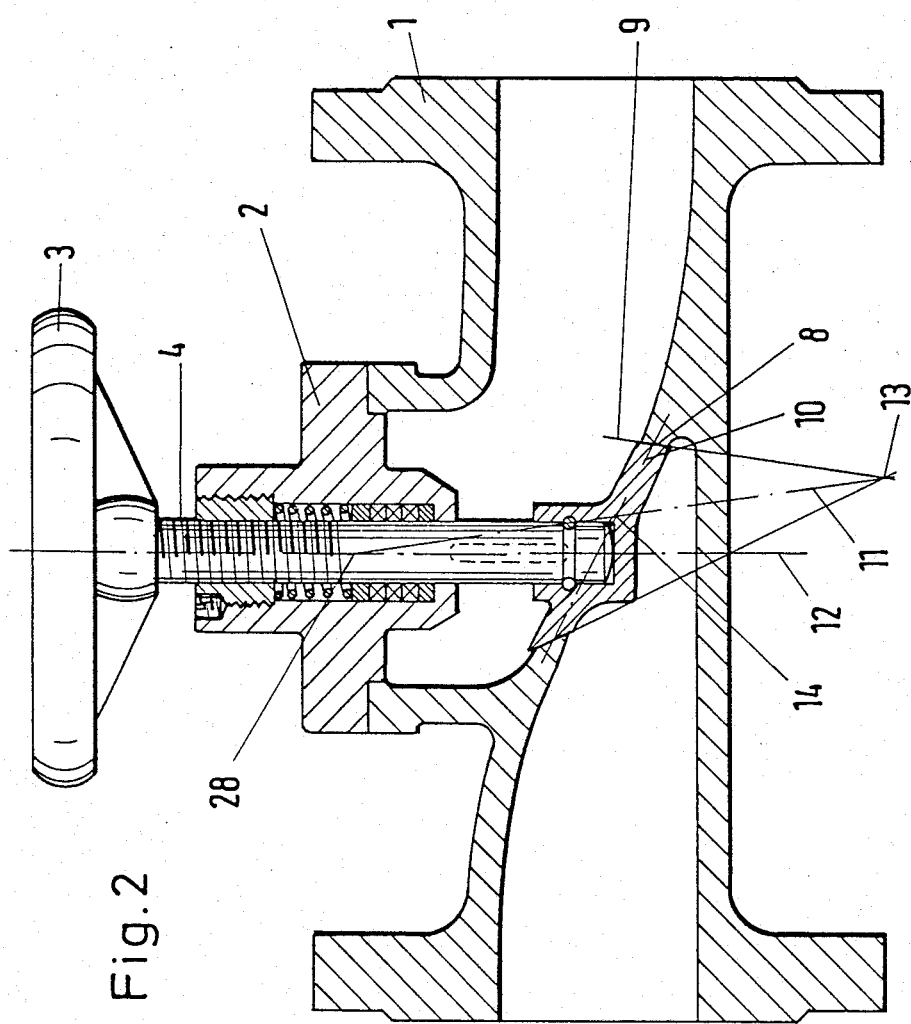
FIG. 2 is a similar sectional view of a modified valve wherein the axis of the conical surface including the sealing face is inclined with reference to the axis of the stem.

FIG. 2 shows a modified valve wherein all such parts which are identical with those of the valve in FIG. 1 are denoted by similar reference characters. The same applies for the embodiments of valves which are shown in FIGS. 3, 4, 5, 6, 7–8, 9 and 10. The axis 11 of the conical surface 9 which is shown in FIG. 2 is inclined with reference to the axis 12 of the stem 4. The point or location 28 where the axes 11 and 12 intersect each other is more distant from the apex 13 of the conical surface 9 than the location or point 14 of intersection between the axis 11 and the seat area 10. The line of action of the force which is applied by the stem 4 for the valving element 6 coincides with the axis 12.

It has been found that the valve of FIG. 2 can ensure an even more reliable equalization of surface pressures between the valving element and the seat along the entire sealing face 8. The optimum position of the location where the line of force which is applied by the stem 4 intersects the seat area 10 and the optimum magnitude of the angle of inclination of the axis 11 of the conical surface 9 can be ascertained by determining the resultant of the pressure upon the sealing face 8, such pressure being assumed to be constant. The influence of differential pressure due to the flow at one or both sides can be taken into account in such optimization.

Figure 3:
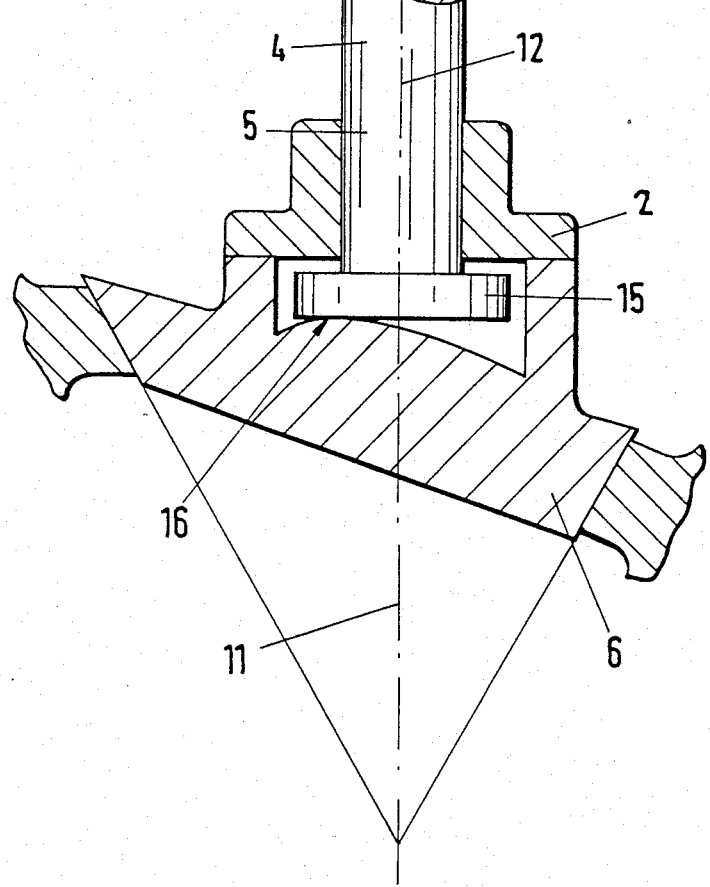
FIG. 3 is a fragmentary axial sectional view of a third valve wherein the axis of the conical surface coincides with the axis of the stem and the valving element has a protuberance which is eccentric to the stem and is engaged by a collar at the inner end of the stem.

FIG. 3 shows a portion of a valve wherein the axis 12 of the stem 4 coincides with the axis 11 of the conical surface. The inner end portion 5 of the stem 4 has an enlargement in the form of a collar 15 which transmits stem force to an eccentrically located protuberance 16 of the valving element 6. This also leads to a predictable surface pressure and an even application of sealing force upon the valve seat. The moment of flexure between the eccentric protuberance 16 and the axis 12 of the stem 4 can be counteracted by using a stiff stem. The end portion 5 can be coupled to the valving element 6 with a reasonable or even substantial amount of play without unduly affecting the alignment of the valving element. The structure of FIG. 3 can be used with advantage in valves wherein the stem 4 cannot or should not rotate. Absence of rotation of the stem 4 relative to the valving element 6 ensures that the protuberance 16 and/or the collar 15 is not subject to wear.

The valve of FIG. 3 is very simple, i.e., the housing, the stem and the valving element can be produced at a low cost. As mentioned above, the moment of flexure can be counteracted by appropriate selection of the dimensions and/or material of the stem.

Figure 4:
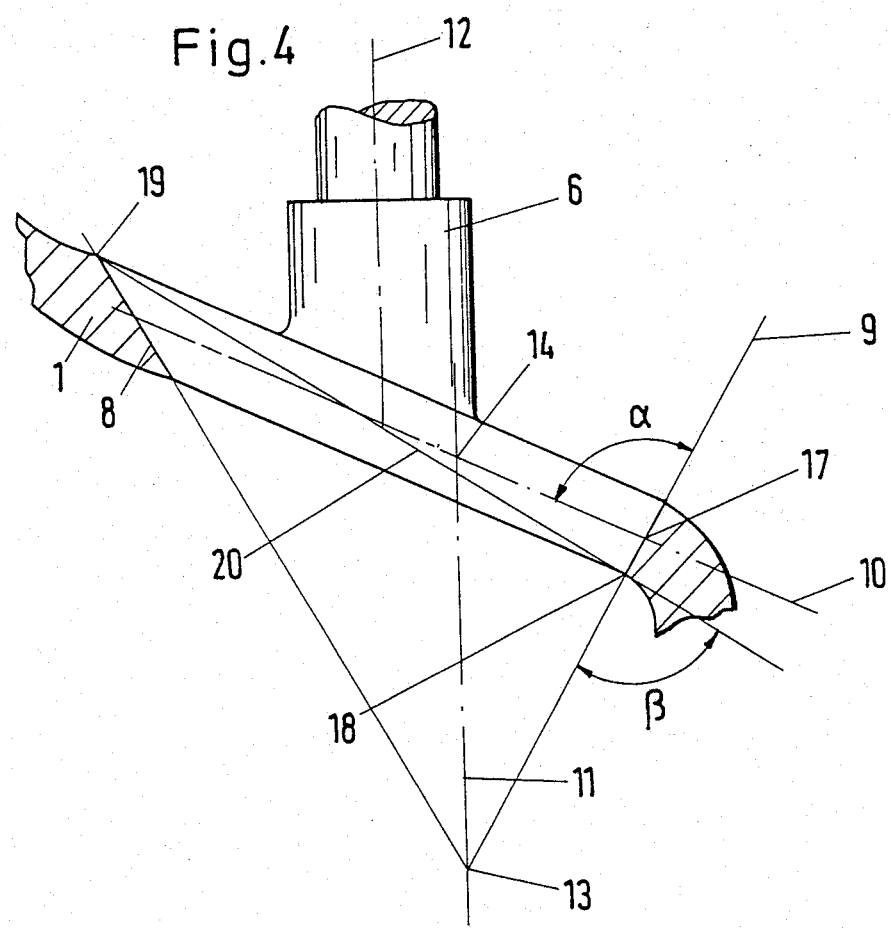
FIG. 4 is a similar fragmentary sectional view of a fourth valve and shows a presently preferred geometry of the sealing face.

Referring to FIG. 4, there is shown a presently preferred geometry of the seat which is part of the housing 1 and is used in a valve wherein the valving element 6 is moved at right angles to the axis of the housing. The sealing face 8 between the valving element 6 and the seat of the housing 1 is relatively large. The reference character 17 denotes the point where the seat area 10 within the confines of the sealing face 8 is intersected by the conical surface 9 at a location nearest to the apex 13. At such point, the sealing face 8 and the seat area 10 make an angle alpha which equals or exceeds 90°. If an imaginary line 20 is drawn between the points 18 and 19 which are located on the sealing face 8 and are respectively nearest to and remotest from the apex 13 of the conical surface 9, this line and the surface 9 make (at the location 17) an angle beta which is not greater than 90°, i.e., less than 91°.

The just described design of the sealing face 8 renders it possible to ensure that, even if the conveyed fluid medium applies pressure to the stem side of the valving element 6 (i.e., to the upper side of the valving element as seen in FIG. 4), the valving element will not be forced through the seat of the housing 1. In addition, such design ensures that the setting of the valving element 6 within the seat of the housing 1 is very stable.

If the seat area 10 within the confines of the sealing face 8 has a three-dimensionally curved form, the axis 12 of the stem 4 will intersect that part of the seat area 10 which is located between the point 14 of intersection of the area 10 with the axis 11 and the part of the sealing face 8 in the region of the point 19 (i.e., the point remotest from the apex 13).

An advantage of the valve which is shown in FIG. 4 is that, during movement of the valving element 6 toward the sealing position, the acting differential pressure urges the valving element against the seat with a force which is uniform along the entire sealing face 8. The likelihood of partial flexure of the valving element 6 (which could lead to leakage) is very remote. Moreover, the valving element 6 is reliably centered in the seat.

The utilization of a seat which has a three-dimensionally curved seat area is often desirable and advantageous because this can entail a considerable reduction of the resistance to flow when the valving element is lifted off the seat. Furthermore, a three-dimensionally curved seat area can exert a desirable effect upon the angle of the resultant of surface pressures at the sealing face 8.

Figure 5:
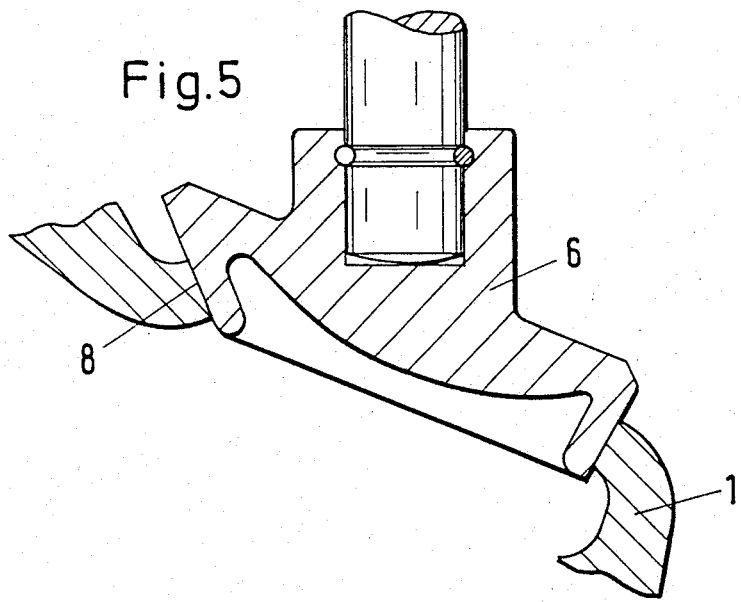
FIG. 5 is a similar fragmentary sectional view of a fifth valve and shows a resilient valving element.
Figure 6:
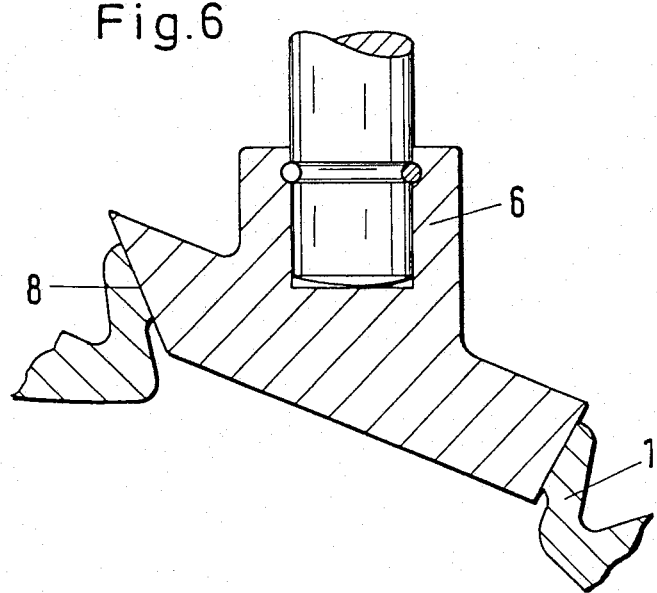
FIG. 6 is a similar sectional view of a sixth valve and shows a resilient seat.

FIG. 5 shows a portion of a valve wherein the marginal portion at least of the valving element 6 (i.e., the portion adjacent the sealing face 8) is resilient. In FIG. 6, the seat of the housing 1 around the valving element 6 is resilient. These undertakings compensate for inaccuracies in machining or other finishing treatment of the valving element 6 and/or housing seat. Moreover, such design can compensate for deformations which are attributable to heating, cooling and/or other stresses as well as to forces which are transmitted by the piping.

The seat and/or the valving element can be elastically or plastically deformable. This depends upon the intended use of the valve. Elastic resiliency is preferred for metallic and elastomeric sealing means whereas a plastic flexibility is advantageous in connection with synthetic resin sealing means. The embodiments which are shown in FIGS. 5 and 6 render it possible to achieve a pressure-assisted surface pressure effect and to compensate for deformations, if any.

FIGS. 7 and 8 show a valve wherein guides 21 and 22 are respectively provided on the housing 1 and valving element 6 to confine the latter to movements in parallelism with the axis 12 of the stem. As shown in FIG. 7, the guides 21 of the housing 1 have guide faces 23 which form part of a circular cylindrical surface whose center is shown at 24. The radially outermost portions of the guides 22 on the valving element 6 abut the surfaces 23 of the adjacent guides 21 in the housing 1. The just discussed design renders it possible to machine the guide faces 23, the sealing face 8 of the seat and the socket for the cover 2 of the housing 1 without rechecking the work. If the housing 1 is relatively large, i.e., if the valve is designed to permit the flow of a fluid medium at a substantial rate and/or if the differential pressures are relatively high, the guides 21 and 22 cooperate to prevent the application of excessive flexural stresses to the stem. The guides 21, 22 not only control the movements of the valving element 6 but they also act as a twist preventing means. Twisting of the valving element 6 is prevented due to eccentricity of the axis 12 of the stem in relation to the center 24 of the cylinder including the guide faces 23 on the guides 21 of the housing 1.

The guides 21, 22 can be modified without departing from the spirit of the invention.

The guide means of FIGS. 7 and 8 can be used with advantage in valves wherein the housing is subjected to pronounced stresses due to large size of the valve and/or as a result of differential pressures. The guide means can forestall damage to the valving element if the latter is pressed against the seat with a force acting against one of its sides due to liquid pressure and the elasticity of the stem. As mentioned above, the guide means can also prevent angular movements of the valving element and ensure that the valving element is centered when it is moved into the seat.

Figure 9:
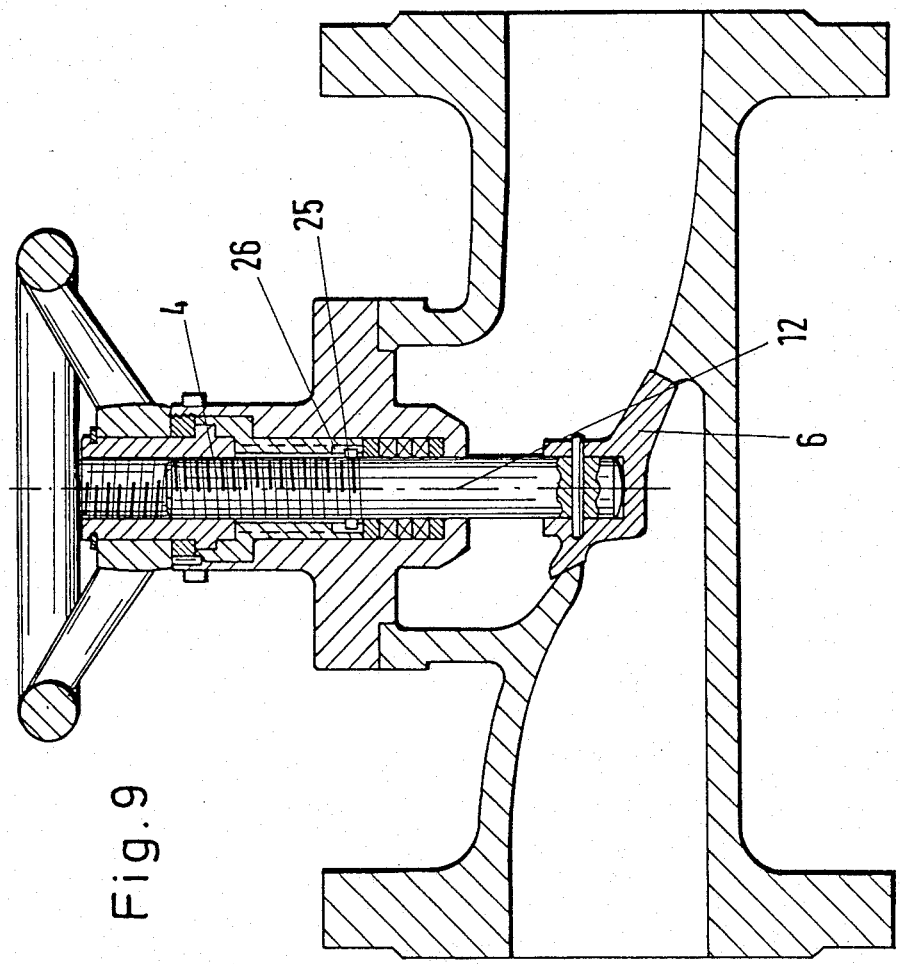
FIG. 9 is a longitudinal sectional view of a valve wherein the valving element is compelled to perform a composite angular and translatory movement in response to advancement toward or away from engagement with the seat.

The valve which is shown in FIG. 9 has a valving element 6 which is first lifted above and away from the seat of the housing and is thereupon turned about the axis 12 of the stem 4 while continuing to rise above the seat. For this purpose, the stem 4 carries a transversely extending guide pin 25 whose end portions extend into guide grooves 26 in a detachable insert of the cover. Those portions of the guide grooves 26 which receive the tips of the pin 25 when the valving element 6 assumes or is close to its sealing position are straight and parallel to the axis 12, and the adjacent portions of the grooves 26 are suitably curved to form portions of helices so that the stem (with the valving element 6 thereon) at first moves without any angular displacement to lift the valving element above and away from the seat and the stem thereupon continues to move axially but simltaneously turns about the axis 12. As shown, the valving element 6 is keyed to the inner end portion of the stem 4. The extent of angular movement of the valving element 6 depends on the configuration of the housing and can be anywhere between 0° and 180°. The illustrated guide means 25, 26 can be modified as long as they ensure that the stem 4 can perform axial as well as angular movements, at least during certain stages of movement of the valving element 6 toward or from engagement with the seat.

The hand wheel for the stem 4 is nonrotatably connected with a nut which mates with the externally threaded upper portion of the stem 4.

The valve of FIG. 9 can be used with advantage in pipelines and the like wherein the valving element should offer little resistance to the flow of a fluid medium when the valve is open. This is achieved by changing the orientation of the valving element on its way from the sealing toward the open position so that it can be positioned in a way to interfere very little (or practically not at all) with the flow of the fluid medium when it is remote from the sealing face 8. Moreover, such mode of moving the valving element can entail a substantial reduction of the distance which is to be covered by the valving element on its way to the open position because the valving element can be moved to an optimum position at a relatively short distance from the sealing position which is shown in FIG. 9.

Figure 10:
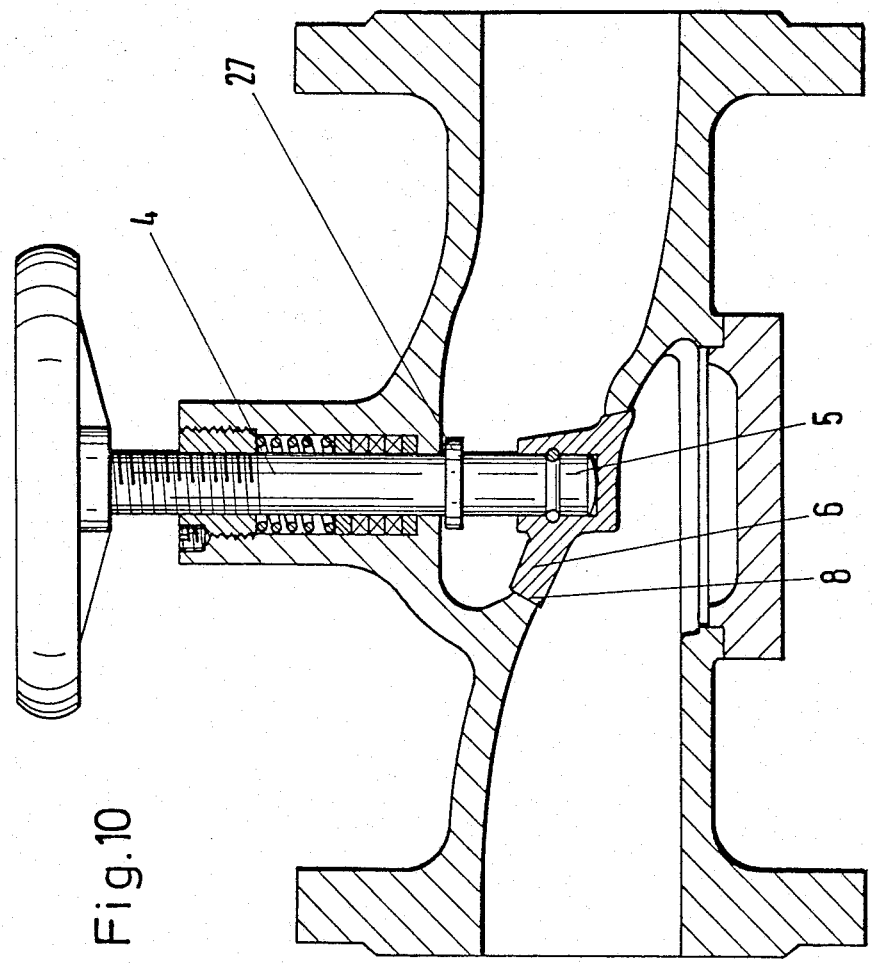
FIG. 10 is a longitudinal sectional view of a further valve wherein the stem is designed to pull the valving element into sealing engagement with the seat.

Referring to FIG. 10, there is shown a valve wherein the valving element 6 is pulled to its sealing position in response to the application of an upwardly directed force which is furnished by the stem 4. The apex of the conical surface which includes the sealing face 8 is located at a level above the seat. The upper side of the valving element 6 has a blind hole or bore for the inner end portion 5 of the stem 4. This prevents leakage of fluid through the valving element. The end portion 5 is rotatable relative to the valving element 6 which is held against angular movement by any suitable means, e.g., by guide ribs or the like provided in the housing and on the valving element (see FIG. 1) and extending in parallelism with the stem 4.

The valve of FIG. 10 can be used to ensure that the stem 4 cannot be forced out of the housing in the event of plant failure. Depending on the nature of the failure, the stem 4 will be drawn into the housing or the valving element 6 will be forced against the sealing face 8 with an even greater force. In the event that the valving element 6 becomes detached from the stem 4, a collar 27 on the stem still prevents extraction or expulsion of the latter from the housing.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A valve comprising a housing; a seat in said housing; a linearity movable valving disposed in said housing; and moving means actuatable to move said element in said housing toward and away from engagement with said seat, said moving means including a stem having a first axis which is inclined with reference to said seat, said seat having a tapered sealing face engageable by said element, constituting a portion of a conical surface and surrounding a seat area, the conical surface having an apex and a second axis, and said stem being actuatable to exert upon said element a stem force having a line of action intersecting said seat area at a first location disposed at a first distance from said apex, said second axis intersecting said seat area at a second location disposed at a lesser second distance from said apex.

2. The valve of claim 1, wherein said second axis is inclined with reference to the line of action of said force.

3. The valve of claim 2, wherein said line of action intersects said second axis at a location more distant from said apex than said second location.

4. The valve of claim 1, wherein said line of action is parallel to said second axis.

5. The valve of claim 1, wherein said stem has an end portion mounted in said valving element and said valving element includes a portion which is eccentric to said first axis and is contacted by said stem while the latter transmits said force.

6. The valve of claim 1, wherein said sealing face has a first portion nearest to and a second portion most distant from said apex, said first portion and said seat area making an angle of at least 90°, and a line which connects said first and second portions making with the sealing face in the region of said first portion an angle of less than 91°.

7. The valve of claim 1, wherein said valving element has a resilient seat-contacting portion.

8. The valve of claim 1, wherein said housing as a resilient portion which defines said seat.

9. The valve of claim 1, wherein said valving element and said housing comprise cooperating guide means for said valving element, said guide means being arranged to confine said valving element to movements in parallelism with said first axis.

10. The valve of claim 1, further comprising cooperating guide means in said housing for imparting to said valving element a combined translatory and angular movement in response to actuation of said moving means.

11. The valve of claim 10, wherein said guide means comprises a portion which is provided on said housing.

12. The valve of claim 10, wherein said guide means comprises a portion which is provided on said stem.

13. The valve of claim 10, wherein said guide means comprises a portion which is provided on said valving element.

14. The valve of claim 1, wherein said seat area is substantially flat.

15. The valve of claim 1, wherein said seat area is curved.

* * * * *